United States Patent
Yamashita

(10) Patent No.: US 6,172,774 B1
(45) Date of Patent: Jan. 9, 2001

(54) STRUCTURE FOR SUPPORTING OPTICAL UNIT OF IMAGE READER

(75) Inventor: Masaaki Yamashita, Kanazawa (JP)

(73) Assignee: PFU Limited, Ishikawa (JP)

( * ) Notice: Under 35 U.S.C. 154(b), the term of this patent shall be extended for 0 days.

(21) Appl. No.: 09/077,199

(22) PCT Filed: Sep. 22, 1997

(86) PCT No.: PCT/JP97/03359

§ 371 Date: Feb. 12, 1999

§ 102(e) Date: Feb. 12, 1999

(87) PCT Pub. No.: WO98/14000

PCT Pub. Date: Apr. 2, 1998

(30) Foreign Application Priority Data

Sep. 25, 1996 (JP) .................................................. 8-275536

(51) Int. Cl.$^7$ ....................................................... H04N 1/04
(52) U.S. Cl. ........................ 358/474; 358/471; 358/496; 358/498
(58) Field of Search ..................................... 358/498, 496, 358/497, 471, 400, 474; 399/367, 374; 271/3.01, 3.14, 4.01, 10.01

(56) References Cited

U.S. PATENT DOCUMENTS

| | | | |
|---|---|---|---|
| 4,754,337 | * | 6/1988 | Nohtomi et al. ...................... 358/496 |
| 5,986,775 | * | 11/1999 | Yoshimizu ........................... 358/496 |

FOREIGN PATENT DOCUMENTS

| | | |
|---|---|---|
| 63-10967 | 1/1988 | (JP) . |
| 1-221978 | 9/1989 | (JP) . |
| 7-20756 | 4/1995 | (JP) . |
| 9-102836 | 4/1997 | (JP) . |

* cited by examiner

Primary Examiner—Cheukfan Lee

(57) ABSTRACT

In an image reader comprising a lower frame disposed below a document path, an upper frame pivotally fitted to the lower frame above the document path via a fulcrum shaft, an optical unit disposed above the document path; a motor for driving a document feeder, and/or the rotation transmission mechanism thereof being mounted on the upper frame, the optical unit has a unit frame as a separate member from the upper frame, and the unit frame and the upper frame are independently pivotally supported by a common fulcrum shaft supported by the lower frame in a non-contact state with each other, and independently engaged at their respective close positions via stopper provided on the lower frame.

7 Claims, 3 Drawing Sheets

STRUCTURE FOR SUPPORTING OPTICAL UNIT OF IMAGE READER

FIELD OF THE INVENTION

This invention relates to a support structure for image reader optical unit for reading the information displayed on a manuscript surface as an image, in which the optical unit is mounted on a frame provided in such a manner as to be swung open around a fulcrum shaft. The support structure according to this invention is particularly suitable for an automatic paper-feed image reader of a double-side reading type.

DESCRIPTION OF THE RELATED ART

There are two types of image input device used as a device for inputting image information to a computer and other information processing equipment: one is the fixed document type often called the flat-bed type, and the other is the stationary optical unit type called the automatic paper-feed type. In addition, a two-in-one unit combining the flat-bed type with the automatic paper-feed type is also known.

FIG. 5 shows a typical example of a conventional type of image reader having a flat-bed reader section A and an automatic paper-feed reader section B. The flat-bed reader section A comprises a document board 1 made of a transparent plate, a swingable document holder 2 placed on the document board 1, and a moving optical unit 3 traveling over the document board 1; a document placed on the document board 1 being read by causing the moving optical unit 3 to travel over the document board 1.

The automatic paper-feed reader section B, on the other hand, comprises a document carrier 4 for carrying a document, a document feeder 8 having a paper-feed roller 5 and two pairs of feed rollers 6 and 7, a stacker 9 for holding document sheets that have been read, and a stationary optical unit 11 provided at a fixed location; a document sheet held between the feed roller pairs 6 and 7 and traveling at a constant speed from the right to the left in the figure being read by the stationary optical unit 11 provided at a fixed location.

A bound document, such as a book, can be read by the flat-bed reader section A, while multiple separate sheets of document can be continuously read by the automatic paper-feed reader section B. When a document is read by the automatic paper-feed reader section B, both sides of a traveling document sheet can be read by disposing the moving optical unit 3 at a location substantially facing the stationary optical unit 11 so that both the optical units 3 and 11 can read both sides of a document sheet simultaneously.

The optical units 3 and 11 each have an image sensor 12, an image pickup lens 12, a reflecting mirror 14 for deviating an optical path, and a light-source lamp 15 for illuminating the document.

The automatic paper-feed reader section B comprises a lower frame 16 and a swingable upper frame 17 so that the document path can be opened in case of paper jams. The upper frame 17 is pivotally fitted to the lower frame by a fulcrum shaft 22, so that a document path 23 is opened by lifting the upper frame 17 upward by disengaging a lock (not shown) provided on the side of the document carrier 4.

The apparatus shown in FIG. 5 is a bottom feed type, in which document sheets on the document carrier 4 are fed one by one from the bottom, with the paper-feed roller 5 provided below the document path 23, rotatably supported by the lower frame 16. A separating pad 18 for separating paper sheets is provided on the side of the upper frame 17 elastically held in contact with the outer periphery of the paper-feed roller 5. The feed roller pairs 6 and 7 feed the document by holding a document sheet between upper rollers 6a and 7a and lower rollers 6b and 7b, both rotatably supported by the upper frame 17 and the lower frame 16, respectively.

The paper-feed roller 5 and the feed roller pairs 6 and 7 are normally driven simultaneously by a single motor 19. In a type where an automatically fed document sheet is read by moving a moving optical unit 3 to the position of the automatic paper-feed reader section B, as shown in FIG. 5, however, it is necessary to reduce the size of the apparatus by installing the motor 19 and other rotation transmission mechanisms 21 in the upper frame 17 since there is not enough space for the motor 19 and other transmission mechanisms 21 in the lower frame 16.

In the example shown in FIG. 5, the upper rollers 6a and 7a of the feed roller pairs 6 and 7 serve as driving rollers, while the lower rollers 6b and 7b as driven rollers rotatably supported in a free-running state. Rotating power is transmitted to the paper-feed roller 5 via a pair of gears provided on the upper and lower frames, which are brought in mesh with each other when the upper frame 17 is closed.

Attempts to miniaturize an image reader of the aforementioned construction by installing the motor 19 and other transmission mechanisms 21 for driving the roller pairs 6 and 7 of the automatic paper-feed reader section B and the document feeder 8 would involve a problem of deterioration in the reading performance of the stationary optical unit 11 provided on the upper frame 17 caused by the vibration generated from these pieces of equipment and propagated to the upper frame 17. The upper frame 17, which is pivotally supported by the lower frame 16 around the fulcrum shaft 22, has low rigidity in the support structure thereof. Any attempt to achieve a small-sized. lightweight equipment with high reading line density using the aforementioned construction would inevitably encounter the problem of aggravated reading quality of the stationary optical unit 11 due to the vibration of the upper frame 17.

SUMMARY OF THE INVENTION

It is a technical task of this invention to obtain technical means to implement an image reader having a swingable upper frame 17 pivotally supported by a lower frame 16 by a fulcrum shaft 22, with a motor 19 for feeding document and other vibration sources installed on the upper frame to prevent the reading quality of the optical unit installed on the upper frame from being aggravated due to the vibration of the upper frame.

To accomplish the aforementioned task, this invention provides an image reader comprising a lower frame disposed below a document path, an upper frame disposed above the document path and pivotally supported by the lower frame via a fulcrum shaft, and an optical unit disposed above the document path, with a motor for driving a document feeder and/or the rotation transmission mechanism thereof installed on the upper frame; the optical unit having a unit frame that is separate from the upper frame; the unit frame and the upper frame being pivotally supported independently in non-contact state by a common fulcrum shaft supported by the lower frame with the respective closed positions thereof being locked independently via stoppers provided on the lower frame.

In the aforementioned conventional type of image reader, the upper frame 17 is apt to vibrate partly because of the existence of gaps between the fulcrum shaft 22 and the hole on the upper frame through which the fulcrum shaft 22 is passed, and partly because of the low rigidity of portions locked by the stopper. Increasing the rigidity of these portions would require appropriate fastening systems using screws, etc., making the opening and closing of the upper frame troublesome.

According to the construction of this invention, the vibration of the upper frame is absorbed by the gaps between the upper frame and the fulcrum shaft, and by low-rigidity portions where the upper frame makes contact with the stopper, and the vibration transmitted to the unit frame as a separate body from the upper frame that is supported by the fulcrum shaft and the stopper is also substantially attenuated. By providing the optical unit on this unit frame, therefore, aggravation of reading quality due to the vibration of the upper frame can be prevented.

Since the optical unit can be opened and closed around the fulcrum shaft, as in the case of the upper frame, adoption of the aforementioned construction causes no hindrance to the document path. In addition, there can be a construction where the upper frame and the unit frame can be opened and closed simultaneously by connecting both via a member having vibration absorbing capability, such as sponge, rubber, leaf springs, etc.

DESCRIPTION OF THE PREFERRED EMBODIMENTS

Figure 1:
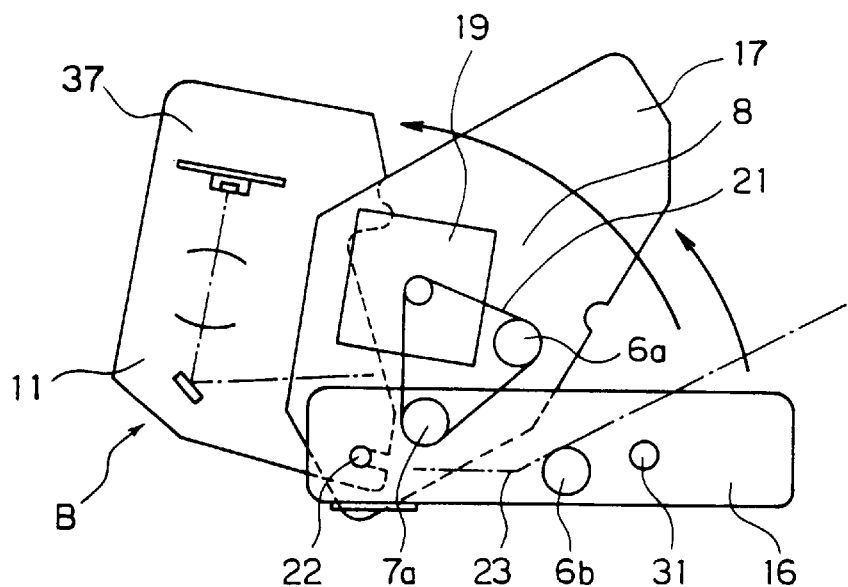
FIG. 1 is a side view illustrating the state where the document path is opened in an embodiment of this invention.
Figure 2:
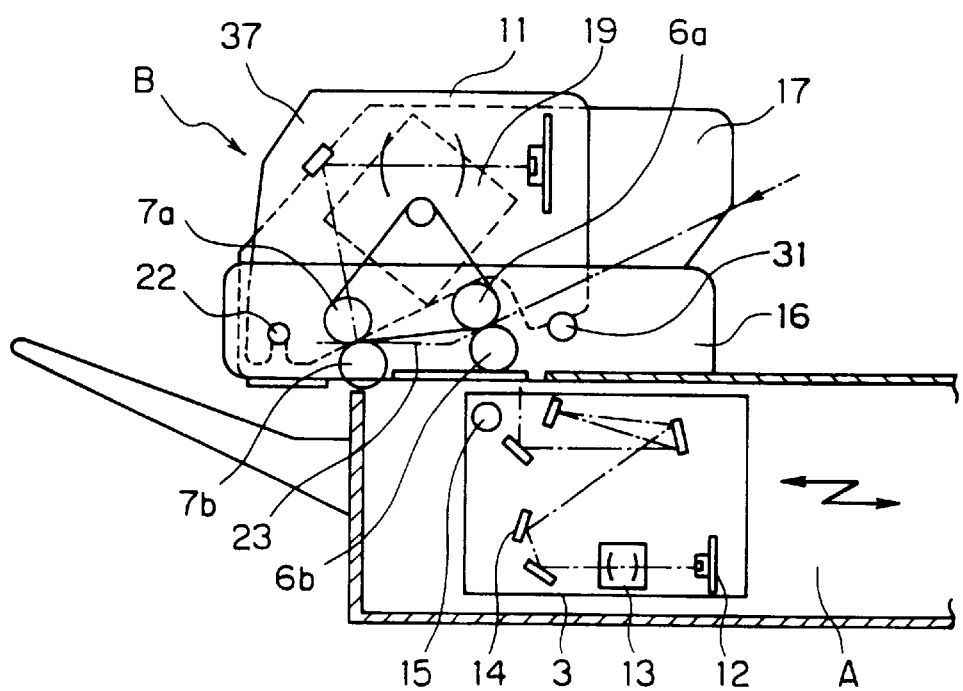
FIG. 2 is a cross-sectional side view illustrating the state where the document path is closed in an image reader embodying this invention.
Figure 3:
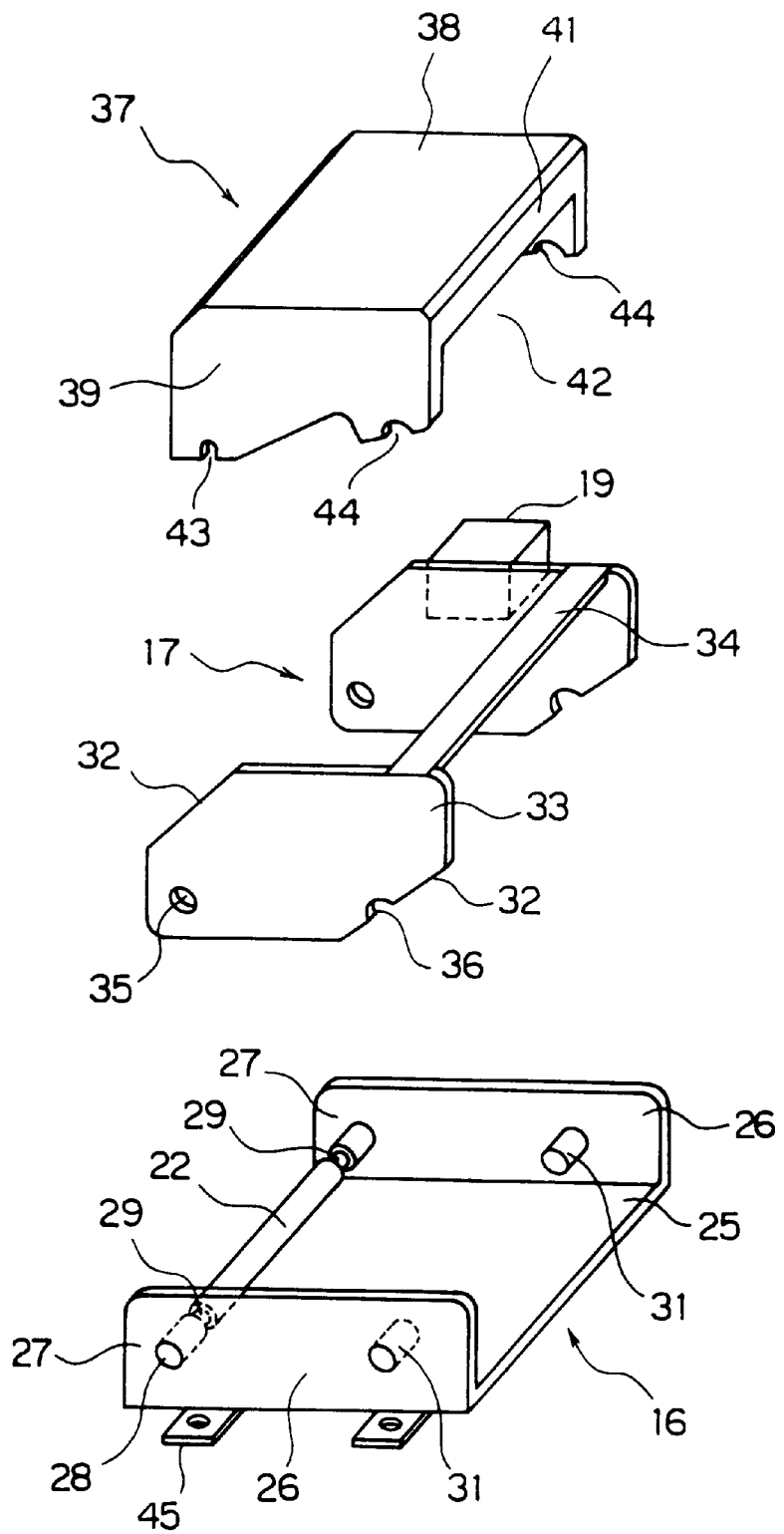
FIG. 3 is an exploded perspective view of a main frame of an automatic paper-feed reader section in an embodiment of this invention.
Figure 4:
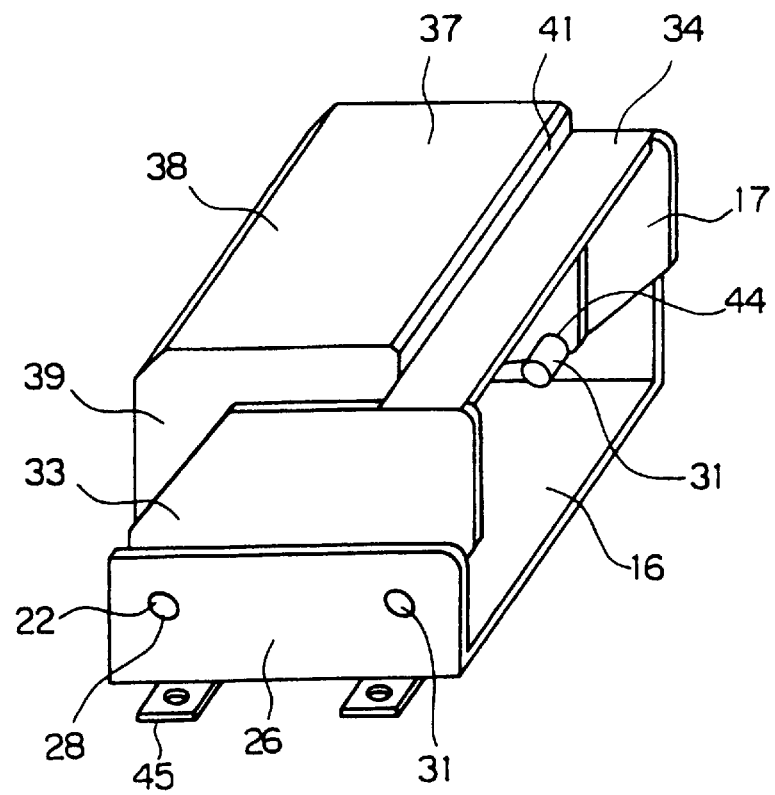
FIG. 4 is a perspective view of a main frame of an automatic paper-feed reader section in an embodiment of this invention.

FIGS. 1 through 4 show embodiments of this invention. FIGS. 3 and 4 show a main frame of an automatic paper-feed reader section B, which has a lower frame 16 fixedly fitted to a flat-bed reader section A. The lower frame 16 has a rectangular bottom plate 25 and side plates 26 and 26 provided on both sides of the bottom plate 25 in an upright position. In the vicinity of the rear edge of the side plates 26 and 26 provided are holes 28 and 28 to which a fulcrum shaft 22 is fitted. Two circumferential grooves 29 and 29 are provided on the fulcrum shaft 22 fitted to the holes 28 and 28. Short column-shaped stopper pins 31 and 31 are provided facing each other on the same axial line in parallel with the fulcrum shaft 22 at portions slightly toward the front edge on the inside surface of the side plates 26 and 26. The terms "front" and "rear" refer to the upstream and downstream sides in the flow of document feeding, and the same applies to the following description.

The main frame of the automatic paper-feed reader section B has an upper frame 17 of a size that can be nested inside the lower frame 16. The upper frame 17 has swing plates 33 and 33 of a substantially rectangular shape with diagonal sides 32 and 32 at the upper rear and lower front corners thereof, and a brace member 34 connecting the upper front edges of the swing plates 33 and 33. Through holes 35 and 35 are provided on the lower rear corners of the swing plates 33 and 33. The upper frame 17 can be swung upward around the fulcrum shaft 22 fitted to the through holes 35 and 35. At the center of the front diagonal sides 32 and 32 of the swing plates 33 and 33 provided are semi-circular engaging recesses 36 and 36, which engage with stopper pins 31 and 31, when the swing plates are swung in the closing direction, to restrict the lower limit position and back and forth movement of the upper frame 17. On the swing plate 33 on the right side (on the upper remote side in the figure) provided is a motor 19 at a location not to interfere with the side plate 26.

Furthermore, the main frame of the automatic paper-feed reader section B has a unit frame 37 that can be nested inside the upper frame 17. The unit frame 37 has a top plate 38 and side plates 39 and 39 hanging from both sides of the top plate 38, and front and rear walls 41 and 41 hanging from the front and rear sides of the top plate 38, and a cavity is formed inside thereof to house the optical unit 11. An opening 42 for inserting document sheets is provided on the front wall 41, and vertical slits 43 and 43 engaging with the circumferential grooves 29 and 29 on the fulcrum shaft 22 and notches 44 are provided on the lower sides of the side walls 39 and 39.

FIG. 4 shows the state where the main frame is assembled. The fulcrum shaft 22 is inserted into the holes 28 and 28 on the lower frame 16 and the through holes 35 and 35 on the upper frame 17 in the state where the upper frame 17 is half-nested in the lower frame 16, and the recesses 36 and 36 on the upper frame 17 are engaged with the stopper pins 31 and 31 on the lower frame 16. Next, the unit frame 37 is nested inside the upper frame 17, the vertical slits 43 and 43 are engaged with the circumferential grooves 29 and 29 of the fulcrum shaft 22, and the notches 44 and 44 are engaged with the stopper pins 31 and 31 on the lower frame 16. The back and forth movement and lower limit position of the upper frame 17 and the unit frame 37 are restricted because both the upper frame 17 and the unit frame 37 are engaged with the stopper pins 31 and 31 via the recesses 36 and 36 and the notches 44 and 44. The lateral movement of the unit frame 37 is restricted because the side walls 39 and 39 thereof make contact with the shouldered portions of the circumferential grooves 29 and 29 as vertical slits 43 and 43 are engaged with the circumferential grooves 29 and 29. The upper frame 17, however, can be swung between the side plates 26 of the lower frame 16 and the side walls 39 of the unit frame 37.

The main frame assembled in the aforementioned manner is placed and fixedly fitted above the moving end of the optical unit 3 of the flat-bed reader section A. as shown in FIG. 2. In this case, the main frame can be fixedly fitted to mounting members 45 and 45 provided on the lower frame 16 via bolts.

FIGS. 1 and 2 shows the state where the unit frame 37 and the upper frame 17 are opened and closed in the automatic paper-feed reader section B having the aforementioned support construction. The lower roller 6b of the feed roller pair 6 is rotatably supported on the lower frame 16, and the lower roller 7b is rotatably supported on the flat-bed reader section A. In the upper frame 17, the upper rollers 6a and 7a are rotatably supported at positions at which the upper rollers 6a and 7a come in contact with the lower rollers 6b and 7b when the upper frame 17 is closed. The upper rollers 6a and 7a are driven in synchronism with each other by a timing belt 21 wound on the motor 19 installed outside the swing plate 33 of the upper frame. On the unit frame 37 provided is a stationary optical unit 11 comprising a reflecting mirror 14, an image pickup lens 13 and an image sensor 12.

INDUSTRIAL APPLICABILITY

Figure 5:
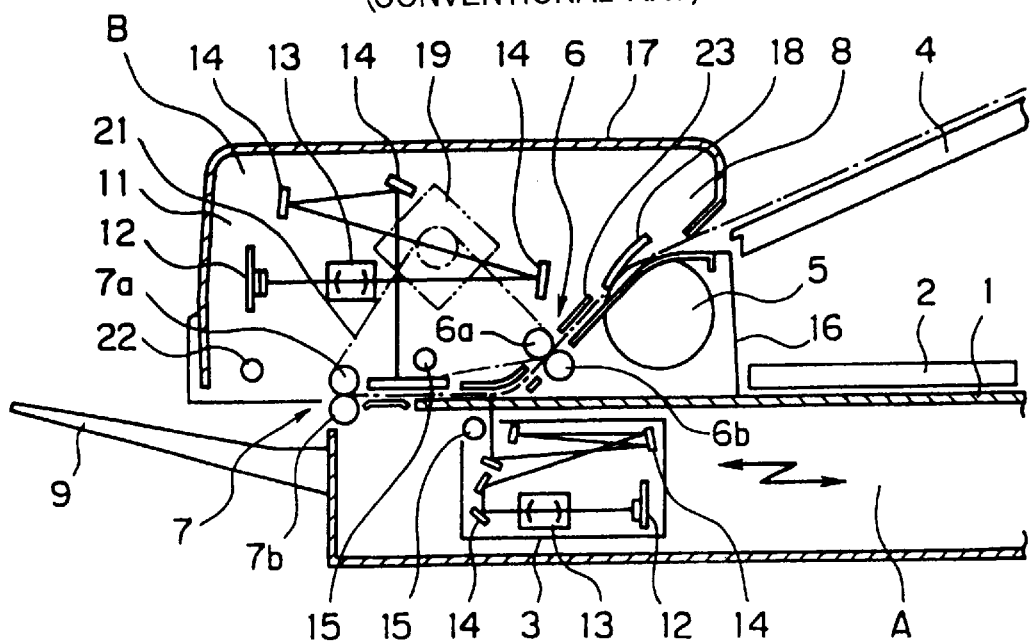
FIG. 5 is a cross-sectional side view illustrating an example of a conventional type of image reader.

Although the manner in which image is read with the aforementioned construction according to this invention is the same as that in the prior art shown in FIG. 5, adoption of the aforementioned construction in the main frame of the automatic paper-feed reader section B prevents the reading quality of the stationary optical unit 11 due to the vibration of the upper frame even when vibration is generated by the motor 19 mounted on the upper frame and the rotation transmission mechanism having the timing belt 21 because the vibration transmitted to the unit frame 37 is substantially reduced.

What is claimed is:

1. An image reader comprising:

a lower frame disposed below a document path and including stoppers and a fulcrum shaft supported by said lower frame;

an upper frame disposed above said document path, pivotally fitted to said lower frame by said fulcrum shaft and having a motor to drive at least one of a document feeder and a rotation transmission mechanism, the motor and the rotation transmission mechanism being mounted on said upper frame; and an optical unit disposed above said document path;

wherein said optical unit has a unit frame being separated from said upper frame, and wherein said unit frame and said upper frame are independently pivotally supported by said fulcrum shaft commonly in a non-contact state with each other and independently engaged at their respective close positions by said stoppers.

2. An image reader according to claim 1, wherein said lower frame comprises a bottom plate and side plates provided upright on both sides of said bottom plate in a document feeding direction, and said fulcrum shaft is provided in the vicinity of the ends of said side plates on the downstream side with respect to the document feeding direction in a direction orthogonally intersecting the document feeding direction.

3. An image reader according to claim 2, wherein short columnar stoppers are provided in parallel with said fulcrum shaft inside the ends of said side plates on the upstream side with respect to the document feeding direction.

4. An image reader according to claim 1, wherein said upper frame comprises swing plates provided upright on both sides of a document being fed, and a brace member connecting the ends of said swing plates on the upstream side with respect to the document feeding direction, and said swing plates are pivotally supported by said fulcrum shaft at the ends thereof on the downstream side with respect to the document feeding direction.

5. An image reader according to claim 1, wherein said unit frame comprises a top plate, side walls hanging from both side edges of said top plate along the document feeding direction, and front and rear walls hanging from the front and rear edges of said top plate in the document feeding direction, and said side walls are pivotally supported by said fulcrum shaft at the side ends of said side walls on the downstream side with respect to the document feeding direction.

6. An image reader according to claim 1, wherein said lower frame comprises a bottom plate and side plates provided upright on both sides of said bottom plate along the document feeding direction; a fulcrum shaft is provided in the vicinity of the ends of said bottom plates on the downstream side with respect to the document feeding direction in the direction orthogonally intersecting the document feeding direction, circumferential grooves are provided on said fulcrum shaft; said unit frame comprises a top plate, side walls hanging from both side edges of said top plate along the document feeding direction, and front and rear walls hanging from the front and rear edges of said top plate in the document feeding direction, and vertical slits provided on the lower sides of said side walls on the downstream side with respect to the document feeding direction; said vertical slits being engaged with said circumferential grooves.

7. An image reader, comprising:

a flat-bed reader section including a moving optical unit disposed below a document board made of a transparent board; and an automatic paper-feed reader section including:

a lower frame disposed below a document path and having a fulcrum shaft supported by said lower frame and stoppers;

an upper frame disposed above said document path, pivotally fitted to said lower frame by said fulcrum shaft and having a motor to drive at least one of a document feeder and a rotation transmission mechanism, the document feeder and the rotation transmission mechanism both being mounted on said upper frame; and an optical unit disposed above said document path;

wherein said optical unit in said automatic paper-feed reader section has a unit frame being separated from said upper frame, and wherein said unit frame and said upper frame are independently pivotally supported by said fulcrum shaft commonly in a non-contact state with each other and independently engaged at their respective close positions by said stoppers.

* * * * *